US006262996B1

(12) United States Patent
Kainulainen et al.

(10) Patent No.: US 6,262,996 B1
(45) Date of Patent: *Jul. 17, 2001

(54) NETWORK ARRANGEMENT

(75) Inventors: Jukka Kainulainen, Helsinki; Arto Peltomäki, Espoo, both of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 08/697,000

(22) PCT Filed: Feb. 23, 1995

(86) PCT No.: PCT/FI95/00097

§ 371 Date: Aug. 21, 1996

§ 102(e) Date: Aug. 21, 1996

(87) PCT Pub. No.: WO95/24083

PCT Pub. Date: Sep. 8, 1995

(30) Foreign Application Priority Data

Feb. 25, 1994 (FI) ........................................ 940927

(51) Int. Cl.[7] .................................................. H04J 3/06
(52) U.S. Cl. ............................................. 370/503; 370/516
(58) Field of Search ...................................... 375/356, 355, 375/357, 326, 354, 362, 364, 307; 370/503, 507, 509, 510, 511, 512, 516

(56) References Cited

U.S. PATENT DOCUMENTS

| 2,986,723 | 5/1961 | Darwin et al. ............... 340/825.26 |
| 4,736,393 | * 4/1988 | Grimes et al. ........................ 375/357 |

(List continued on next page.)

FOREIGN PATENT DOCUMENTS

| 490 315 | 6/1992 | (FR) . |
| 94/11962 | 5/1994 | (WO) . |
| WO 94/22251 | 9/1994 | (WO) ........................... H04L/12/48 |

OTHER PUBLICATIONS

IBM Technical Disclosure Bulletin, vol. 25, No. 11B, Apr. 1983, L.S. Rogers, "Clock Source Selection Method in Distributed Communication System Networks", pp. 6293–6298.

CCITT G.703, 1991.

CCITT G.704, 1991.

ITU–T Recommunication G.708, 1993.

ITU–T Recommunication G.709, 1993.

Primary Examiner—Douglas Olms
Assistant Examiner—Kenneth Vanderpuye
(74) Attorney, Agent, or Firm—Pillsbury Winthrop LLP

(57) ABSTRACT

A network arrangement and a method for connecting a message-based system (using message-based synchronization) with an external system by converting the synchronization status received from the external system into the internal synchronization status of the message-based system in an interface node of the message-based system in such a manner that the level in the internal synchronization hierarchy of the message-based system (as indicated by the internal synchronization status) rises or falls corresponding to a corresponding rise or fall of a predetermined magnitude occurring in the synchronization status of the external system. Alternatively, the external system is connected to the message-based system by converting the synchronization status received from the external system into the internal synchronization status of the message-based system in an interface node of the system using message-based synchronization in such a manner that the internal synchronization status achieves a certain constant level in the internal synchronization hierarchy of the system and that the constant level is used together with the synchronization status data received from the external system in selecting the source of synchronization in the message-based system.

12 Claims, 4 Drawing Sheets

U.S. PATENT DOCUMENTS

| | | | |
|---|---|---|---|
| 4,837,850 | 6/1989 | Maisel et al. | 455/527 |
| 4,939,753 | 7/1990 | Olson | 375/356 |
| 5,068,877 * | 11/1991 | Near et al. | 375/356 |
| 5,327,425 * | 7/1994 | Niwa et al. | 370/452 |
| 5,428,645 * | 6/1995 | Polev et al. | 375/356 |
| 5,475,717 * | 12/1995 | Cordonnier et al. | 370/507 |
| 5,535,217 * | 7/1996 | Cheung et al. | 395/200.78 |
| 5,689,688 * | 11/1997 | Strong et al. | 375/553 |
| 5,696,799 * | 12/1997 | Kianulainen | 375/356 |
| 5,706,291 * | 1/1998 | Kainulainen | 370/503 |

\* cited by examiner

NETWORK ARRANGEMENT

FIELD OF THE INVENTION

The present invention relates to for connecting a system utilizing message-based synchronization with an external system, and a network arrangement.

BACKGROUND OF THE INVENTION

The object of the invention is to be able to use an external system as a source of synchronization of a system using message-based synchronization. An external system typically uses a synchronization method different from that of a system utilizing message-based synchronization, but in principle, an external system can also use message-based synchronization, as will be described later.

As used in the text below, the term node refers to a junction point between transmission lines in a system. A node may be any device or equipment capable of affecting clock synchronization, such as a branching or cross-connection means.

Nodes in a system utilizing message-based synchronization are interconnected by transmission lines which the nodes use for data transmission. These lines also forward the clock frequency of the transmitting party to the receiving party. Each node selects the frequency of a signal from a neighbouring node, the frequency of its own internal clock source or a frequency applied to the node via a separate synchronization input from an external clock source as the source of its own clock frequency. In order that all nodes in the system would operate at the same clock frequency, one usually attempts to make the system synchronize itself with a single clock source called a master source. All system nodes connected directly to the selected master source are thus synchronized with the master source while nodes connected to the nodes adjacent to the master source but not directly connected to the master source are synchronized with these adjacent nodes. Accordingly, each node at a greater distance from the master source synchronizes itself with a node one node spacing closer to the master source.

In order that the above-described synchronization hierarchy could be established within the system, the system nodes interchange synchronization messages. These messages contain information by means of which individual nodes are able to select a timing source. The system nodes are prioritized and the system tends to synchronize itself with the clock frequency of a node having the highest level of priority. Normally each priority level is assigned to a single system node. Synchronization messages normally contain information about the origin of the clock frequency of the node transmitting the message and the priority of the node as well as a value describing the quality of the clock signal. Accordingly, a neighboring node clock frequency which originates from a desired node and which is of the highest quality can be selected by an individual node as the source of its own clock frequency. At the system start-up each node selects its own internal clock source as the source of its clock frequency as it has not yet processed any incoming synchronization messages. After the node has processed the first incoming synchronization messages, it selects the clock frequency of a neighboring node having the highest level of priority as the source of its clock frequency. After all messages have been distributed over the system and the system has achieved a stable state as far as synchronization is concerned, the system has been synchronized hierarchically with the clock frequency of the master source.

FIG. 1 shows a system MS utilizing message-based synchronization in a stable situation. Priorities assigned to the nodes are indicated by numbers within the circles representing the nodes. The smaller the number, the higher the priority of the node. Synchronization messages transmitted by a node n (n=1 ... 6) are indicated by the reference MSGn. Synchronization messages transmitted by different nodes usually differ from each other and depend on the applied message-based synchronization method. The distribution of the clock frequency from the master clock (node 1) to the other system nodes is illustrated by solid lines. Internodal connections drawn by broken lines are not used in a normal situation for system synchronization, but they are available in change situations.

Message-based synchronization is based on a simple principle that the user defines the synchronization hierarchy of the nodes by assigning each node a dedicated signature indicating the hierarchical level of the node and that the system synchronizes itself with the defined master clock independently by utilizing, if required, all existing internodal connections. If the connection to the master clock fails, and no alternative connection exists, or if the master clock fails, the system synchronizes itself with a node of the next highest level of hierarchy. Response to a change in synchronization takes place by message interchange between nodes.

Message-based synchronization methods of the type described above are described e.g. in U.S. Pat. Nos. 2,986,723 and 4,837,850, which are referred to for a more detailed description. Messages used in one prior art message-based synchronization method (SOMS) will be described more closely below with reference to FIGS. 2 and 3.

A system employing message-based synchronization forms a kind of closed system, at least as far as synchronization is concerned (often also with respect to data transmission). This is problematic as there nevertheless exists a need to interconnect different types of networks.

In the above-mentioned U.S. Pat. No. 4,837,850, an exchange of a network utilizing message-based synchronization is connected to an exchange of a higher level, but fixed definitions are used in the network in such a manner that all those exchanges that are connected to such an exchange have the highest classification within the network. An arrangement of this type does not enable, for instance, several external sources of synchronization to be connected flexibly with the system.

SUMMARY OF THE INVENTION

The object of the present invention is to provide a network arrangement by means of which it is possible to connect a system utilizing a message-based synchronization method as flexibly as possible with one or more external systems also with respect to synchronization. This object is achieved with the method of the invention for connecting a message-based system (using message-based synchronization) with an external system, the message-based system comprising a plurality of nodes interchanging signals containing synchronization messages with information about the priority of the respective signals in the internal synchronization hierarchy of the system. The method is characterized in that the external system is connected to the message-based system by converting the synchronization status received from the external system into the internal synchronization status of the message-based system in an interface node of the message-based system in such a manner that the level in the internal synchronization hierarchy of the message-based system (as indicated by the internal synchronization status) rises or falls corresponding to a corresponding rise or fall of a predetermined magnitude occurring in the synchronization status of the external system.

This object is further achieved in a second embodiment by a method for connecting a message-based system with an external system, the message-based system comprising a plurality of nodes interchanging signals containing synchronization messages with information about the priority of the respective signal in the internal synchronization hierarchy of the system. The method is characterized in that the external system is connected to the message-based system by converting the synchronization status received from the external system into the internal synchronization status of the message-based system in an interface node of the system using message-based synchronization in such a manner that the internal synchronization status achieves a certain constant level in the internal synchronization hierarchy of the system and that the constant level is used together with the synchronization status data received from the external system in selecting the source of synchronization in the message-based system.

As for the network arrangement of the invention, it is characterized by a network arrangement comprising a system using message-based synchronization, the message-based system comprising a plurality of nodes interchanging signals containing synchronization messages with information about the priority of the respective signals in the internal synchronization hierarchy of the system, characterized in that the interface node of the message-based system comprises means for converting the synchronization status received from the external system into the internal synchronization status of the message-based system in such a manner that the level indicated by the internal synchronization status rises or falls corresponding to a corresponding rise or fall of a predetermined magnitude occurring in the synchronization status of the external system.

The invention is further characterized by a network arrangement comprising a message-based system comprising a plurality of nodes interchanging signals containing synchronization messages with information about the priority of the respective signal in the internal synchronization hierarchy of the system, characterized in that the interface node of the message-based system comprises means for converting the synchronization status received from the external system into the internal predetermined constant status of the message-based system and that the interface node comprises means for transmitting the data describing the synchronization status of the external system to the synchronization decision-making part of the node.

The idea of the invention is to convert the synchronization statuses of the signals arriving from an external system in order for these signals (or actually, these signals as sources of clock frequencies) to be placed in the hierarchy of the message-based synchronization in such a manner that a synchronization status received from the external system is also taken into account when selecting the source of synchronization in the message-based system. In principle, this can be accomplished in one the following ways: (a) the conversion of the synchronization status of the external system is carried out automatically by using the rules stored (fixedly) in the system in advance, (b) the user defines how the conversion is to be carried out, (c) the result of the conversion is always the same (when the signal received from the external system is valid), but in addition to this result, the synchronization status received from the external system is utilized as such in selecting the source of synchronization in the message-based system. (Synchronization status reveals the quality or priority of the clock frequency of the source of synchronization in the internal synchronization hierarchy of a system. Synchronization status is given in a synchronization message or as a separate bit/bit pattern in a position assigned to it in the frame structure of a signal.)

Due to the solution of the invention, it is possible to monitor the synchronization status data of an external system also within a message-based system, whereby the signals arriving from the external system/systems can also be separated from each other and classified. It is thus easy to select the best signal obtained from the external system if synchronization with the external system is desirable. On the other hand, it is possible to define several signals of the external system to be such that they can be used for synchronization if needed, because the state of such signals can be monitored closely.

BRIEF DESCRIPTION OF THE DRAWINGS

In the following, the invention and its preferred embodiments will be described in more detail with reference to the examples shown in FIGS. 2 to 6 of the attached drawings, in which.

DETAILED DESCRIPTION OF THE PRESENTLY PREFERRED EXEMPLARY EMBODIMENTS OF THE INVENTION

Figure 1:
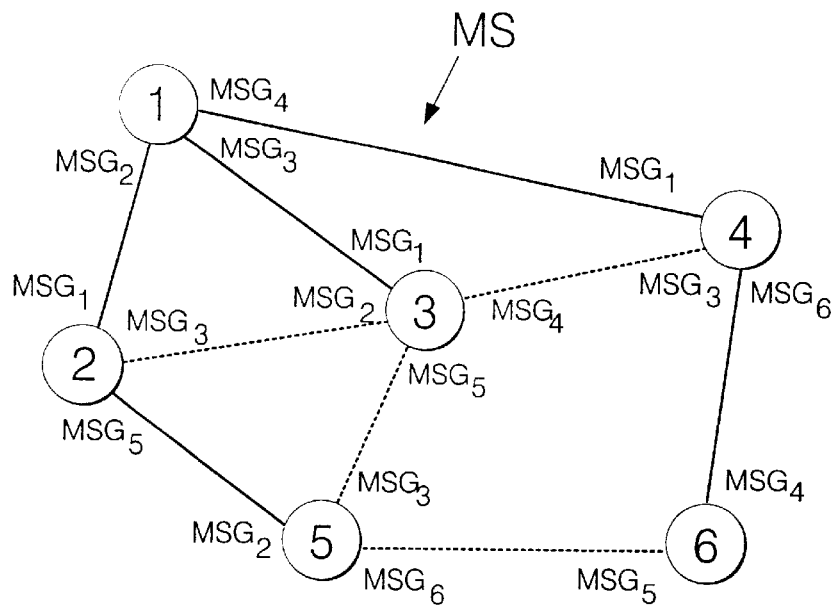
FIG. 1 illustrates a system employing message-based synchronization when the system is in synchronization with the clock frequency of the master source.
Figure 2:
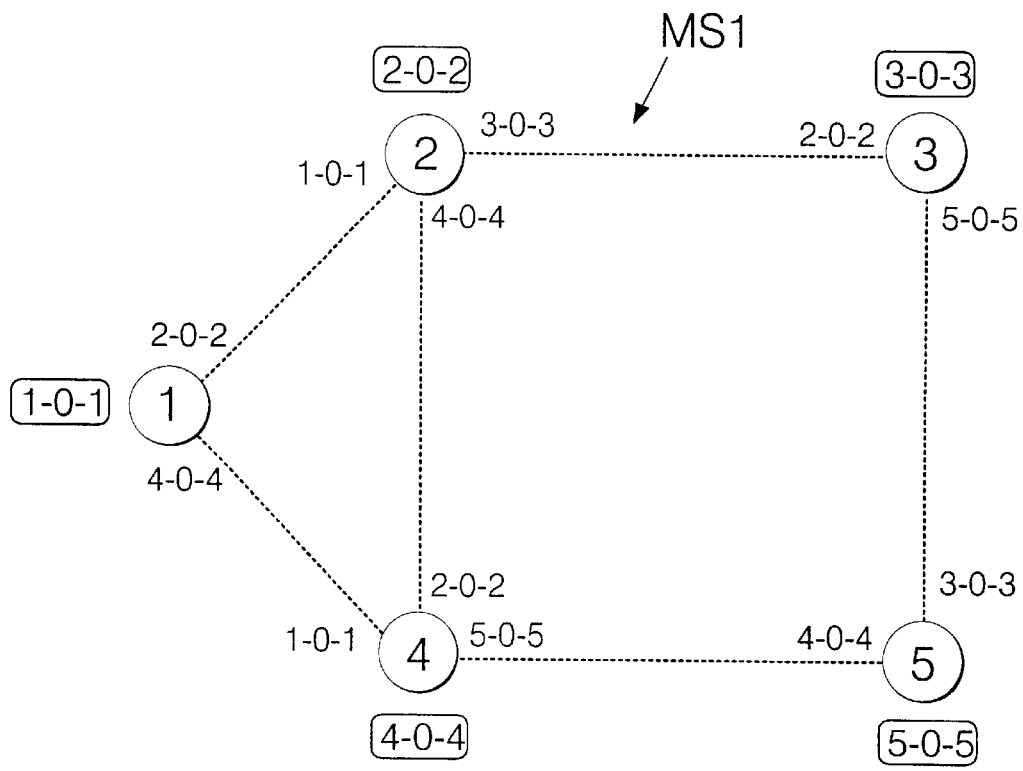
FIG. 2 illustrates a network employing self-organizing master-slave synchronization (SOMS) in its initial state.

FIG. 2 illustrates a system employing self-organizing master-slave synchronization (SOMS), which is a known message-based synchronizing method. In this specific case, the system comprises five nodes (or devices) assigned SOMS addresses indicated by the reference numerals 1 . . . 5 according to their level of hierarchy. (The master node of the system has the smallest SOMS address.) The nodes interchange messages containing such SOMS addresses. In this way the nodes are able to identify each other by means of the address numbers and establish a synchronization hierarchy so that the whole network can synchronize itself with the master node.

As mentioned above, messages transmitted continually in the network are dependent on the applied message-based synchronization method. In addition, the messages are specific for each transmitting node. In the SOMS network a synchronization message contains three different parts: a frame structure, signature and check sum. The SOMS signature is the most important part. of the SOMS message. It comprises three consecutive numbers D1 to D3:

D1 is the origin of the synchronization frequency of a node transmitting a SOMS message, i.e. the SOMS address of a node appearing as a master node to the transmitting node.

D2 is a parameter describing the quality of the connection, typically a distance to a node indicated by D1. The distance is given as the number of intermediate nodes.

D3 is the SOMS address of a transmitting node.

Each node (or device) compares continuously incoming SOMS signatures with each other and selects the smallest amongst them. In the signature the different parts D1, D2 and D3 are combined into a single number by placing them in succession (D1D2D3) (for the sake of clarity, a dash will be inserted between the different parts in the text below as follows: D1-D2-D3). Accordingly, a primary criterion for the selection of the smallest address is the SOMS address (D1) of a node appearing as the master node to the preceding nodes, i.e. the node tends to be synchronized with a signal having a frequency originally derived from a node with the smallest possible address. In a stable situation, the whole network is thus synchronized with the same master node (as the master node of the whole network has the smallest SOMS address).

If two or more of the incoming signals are synchronized with the same master node, the one arriving over the shortest path (D2) is selected. The last criterion for selection is the SOMS address (D3) of the node transmitting the SOMS message, which is used for the selection if the incoming signals cannot be distinguished from each other in any other way.

After the node has accepted one of the neighboring nodes as its new synchronization source on the basis of an incoming SOMS signature, it has to regenerate its own SOMS signature. The new SOMS signature can be derived from the selected smallest SOMS signature as follows: the first part (D1) is left intact; the second part (D2) is incremented by one, and the third part (D3) is replaced with the node's own SOMS address.

Each node also has its own internal SOMS signature X-O-X, where X is the SOMS address of the node. If none of the incoming SOMS messages contains a signature smaller than the internal signature, the node uses its own internal oscillator or possibly a separate synchronization input as the source of clock frequency. Of course, the outgoing SOMS message thereby employs the internal SOMS signature.

The nodes transmit continuously SOMS messages in all directions in order that any changed data in the SOMS signatures would be distributed as rapidly as possible and that they would know the current operating condition of neighboring nodes. The SOMS signatures cannot be compared with each other until the incoming SOMS messages have been accepted and the SOMS signatures have been extracted from the messages.

When the first SOMS message is received from a specific transmission line, the SOMS signature contained therein is accepted immediately for comparison if the message is faultless. When the incoming transmission line has an accepted SOMS signature and faultless messages containing the same signature are received continuously, the situation remains unchanged. If the SOMS message is found to be faulty, the current SOMS signature is retained until three successive faulty SOMS messages have been received. At this stage the old SOMS signature is no longer accepted for comparison. Waiting for three successive SOMS messages aims at eliminating temporary disturbances.

If no SOMS message is received from the line and there is no line failure, the current SOMS signature is rejected only after a period of time corresponding to three successive SOMS messages. If the line fails totally, the SOMS signature is rejected immediately. If no appropriate SOMS signature is available for comparison due to disturbances in the incoming signal, the SOMS signature of the transmission line is rejected. A constant-value signature where all parts (D1, D2, D3) have their maximum value (MAX-MAX-MAX) is thereby used in the comparison as the SOMS signature of this incoming transmission line.

When a new changed SOMS signature is detected in an incoming SOMS message, it is accepted immediately for comparison, if the message is faultless. In this way there will be no unnecessary delays in network changes.

Initially each node employs its own internal synchronization source, and transmits its own internal SOMS signature X-O-X to the other nodes. This signature is also compared with incoming SOMS signatures. If none of the incoming signatures is smaller than the internal signature, the node continues to use its own internal timing.

In FIG. 2, the SOMS network is shown in an initial state when none of the nodes (or devices) has yet processed any one of the incoming SOMS messages. In all nodes, the highest priority is assigned to the internal SOMS signature of the node as no other signatures have yet been processed. In FIG. 2, the SOMS signatures are indicated beside each node to which they are transmitted, and the selected signature is written within the frame (in the initial situation shown in FIG. 2 all nodes employ their internal timing source). Lines used in synchronization are drawn by a continuous line and standby lines are drawn by a broken line (in the initial situation shown in FIG. 2, all lines are standby lines).

Figure 3:
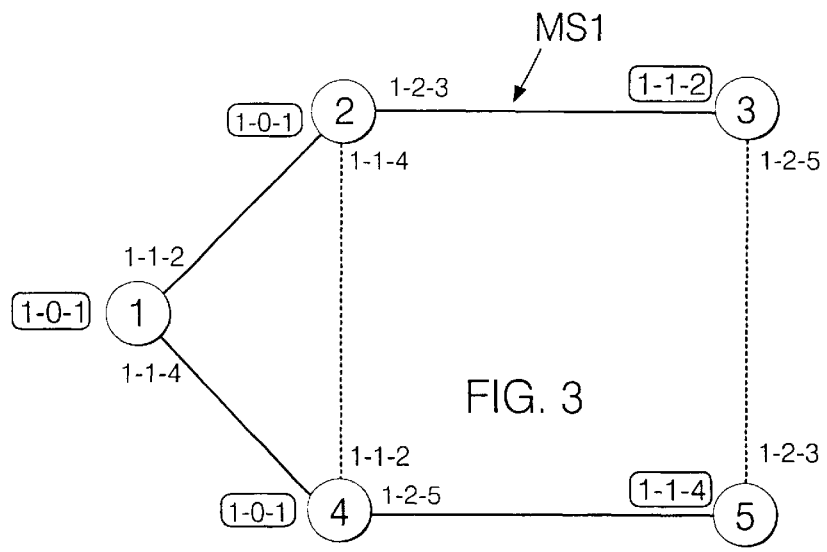
FIG. 3 illustrates the network of FIG. 2 in a stable state.

When the nodes start to process the incoming SOMS messages, node 1 retains the use of the internal timing, nodes 2 and 4 synchronize themselves with node 1 on the basis of the signature 1-0-1, node 3 is synchronized with node 2 (2-0-2), and node 5 with node 3 (3-0-3). At the same time the nodes generate their own new SOMS signatures as described above and provide their outgoing SOMS message with the new signature. The network in a stable situation is shown in FIG. 3. All the nodes have synchronized with the master node 1 over the shortest possible path.

In order to enable the connection of the above-mentioned system employing message-based synchronization to an external system, an interface is provided between the system utilizing message-based synchronization and the external system, this interface exhibiting appropriate synchronization methods on its both sides. The synchronization status indicated by a signal arriving through this interface at the side of the system utilizing message-based synchronization is converted (in the node of the message-based system where said signal is received) to be included in the hierarchy of the message-based system in such a manner that the synchronization status received from the external system is taken into account in selecting the source of synchronization in the message-based system. The external signal thus participates in the message-based synchronization with the signature it has obtained as a result of the conversion (and possibly also with status data received from the external network, as will be described below).

Furthermore, the system employing message-based synchronization should also be capable of transmitting appropriate messages if such messages are used in the external network. The interface should also contain the basic algorithms of the synchronization method of the external network if messages or status bits are to be forwarded to the external network. As the present invention, however, relates to the connection of an external system as a timing source to a system employing message-based synchronization, and as the type of the external system may vary, forwarding messages or bits in the other direction will not be described more closely herein.

Figure 4A:
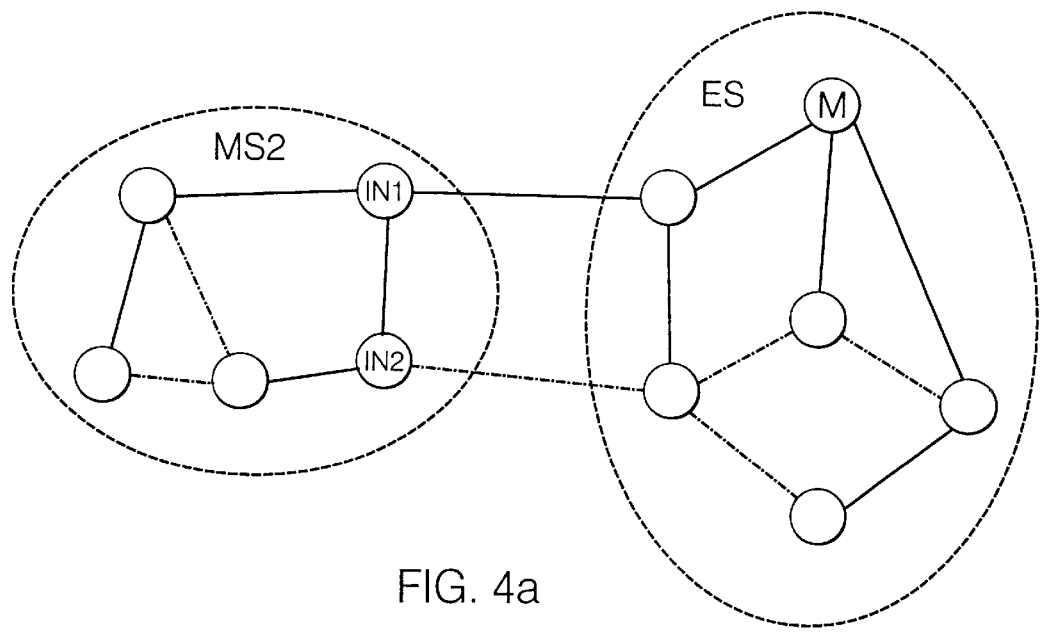
FIG. 4a illustrates schematically the connection of an external system with a system utilizing message-based synchronization, when one connection between the systems is used for synchronization.
Figure 4B:
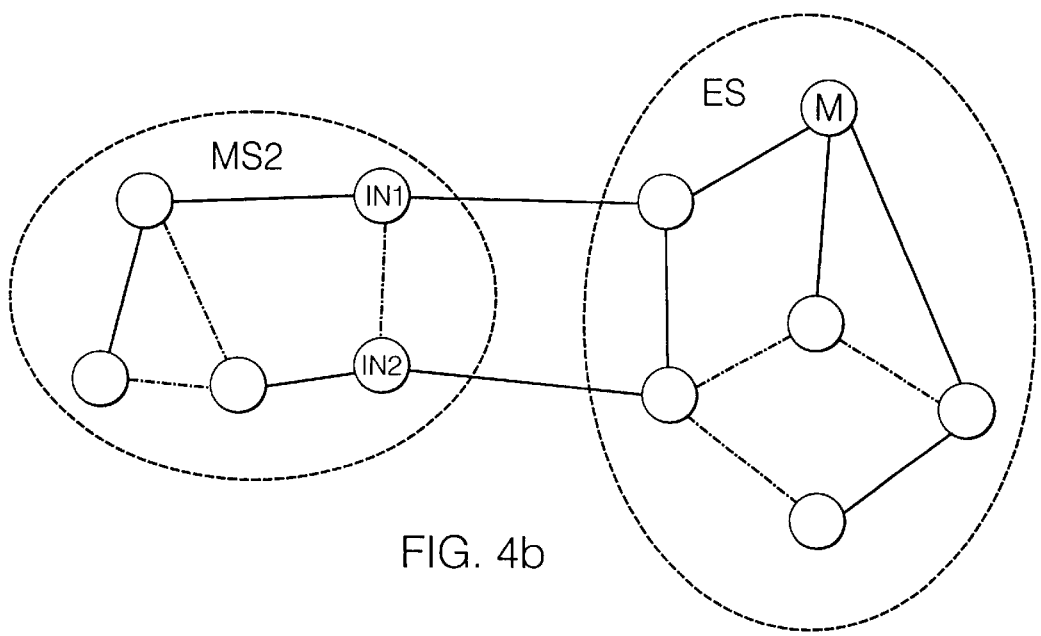
FIG. 4b illustrates schematically the connection of an external system with a system utilizing message-based synchronization, when two connections between the systems are used for synchronization.

FIGS. 4a and 4b illustrate schematically the connection of an external system ES with a network MS2 utilizing message-based synchronization. The external system may be for instance a public network maintained by a teleoperator and the system using message-based synchronization may be a (non-public) dedicated network, or the external system may be a long-distance trunk network and the system using message-based synchronization may be a local network. The nodes, which are indicated by mere circles, except the master node indicated by the reference M and the interface nodes of the network MS2 by the references IN1 and IN2, are thus conventional telecommunication network elements and the connections between them typically 2 Mbit/s PCM connections according to CCITT recommendations G.703 and G.704.

The system MS2 utilizing message-based synchronization synchronizes itself with the clock frequency provided by the external system. In the example of FIG. 4a, only one connection (continuous line) between the systems is used for synchronization, whereas in the example of FIG. 4b, both connections between the systems are used for synchronization (conversion is carried out in both interface nodes).

Two alternatives can be used in implementing the solution of the invention, depending on which part of the interface node (IN1 or IN2) the conversion is carried out in:

1. The conversion can be carried out in the message-processing part of the interface unit of the node, synchronization signatures of the message-based system only being thus transmitted to the decision-making part of the node from the interface unit of the node.

2. The conversion can be carried out by the decision-making part of the synchronization of the control unit of the node after it has received the signature according to the external system from the interface unit.

Figure 5:
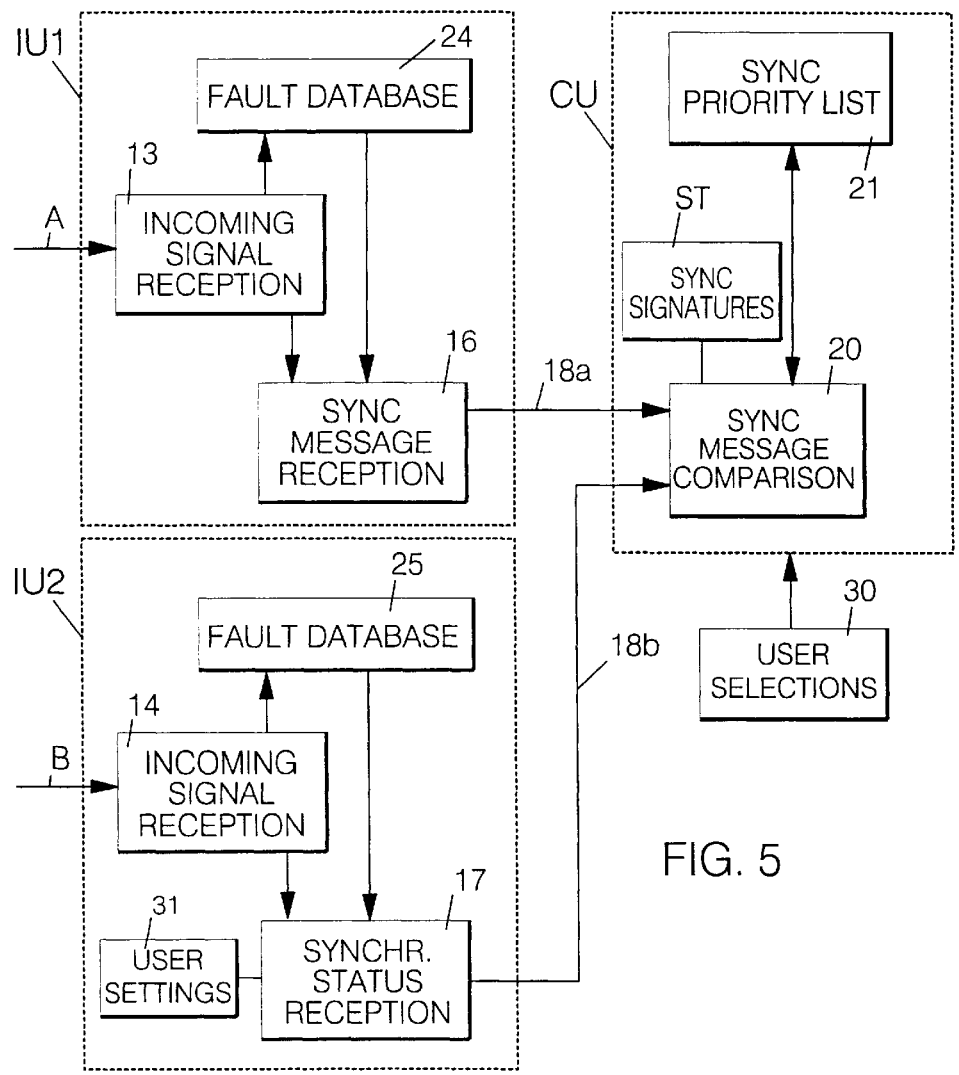
FIG. 5 illustrates the signature formation according to the invention in a first embodiment of the invention.
Figure 6:
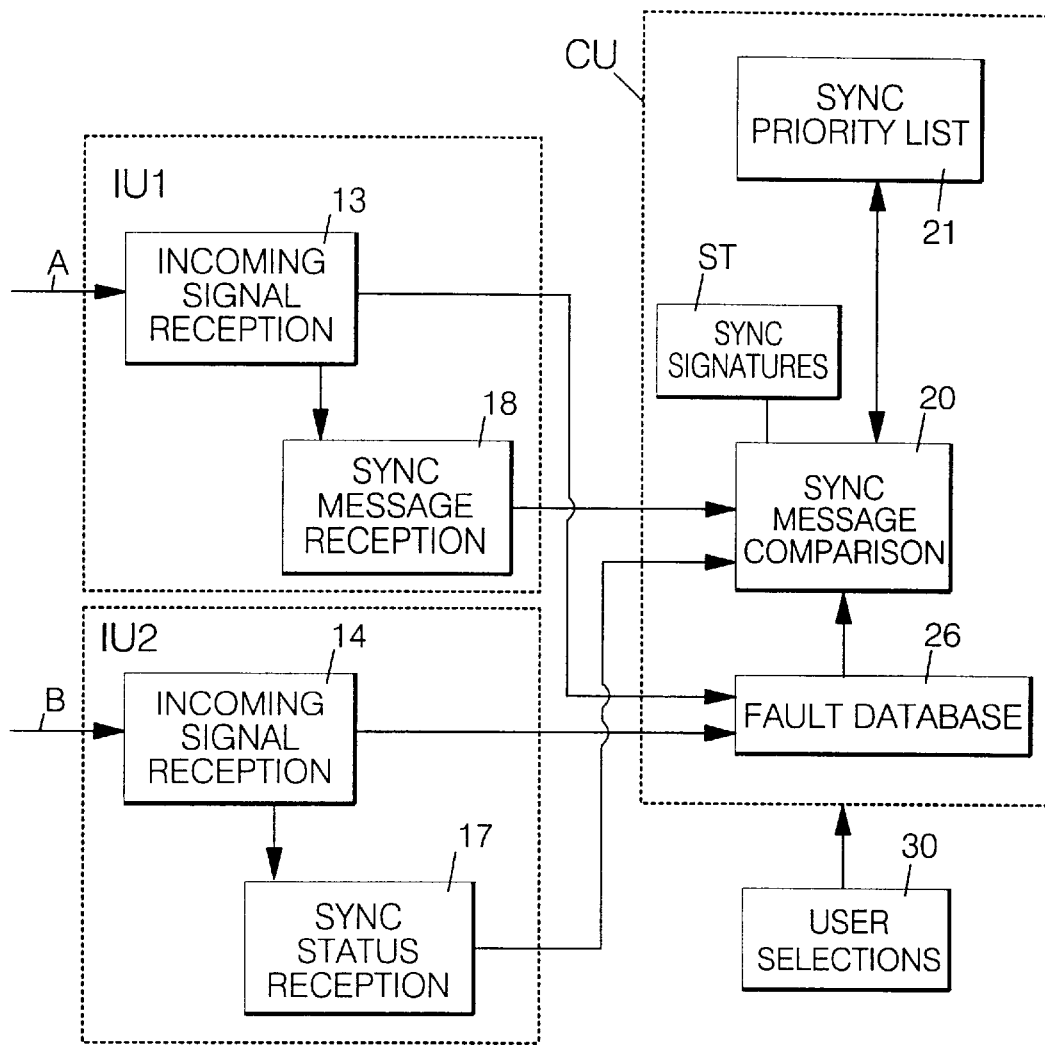
FIG. 6 illustrates the signature formation according to the invention in a second embodiment of the invention.

These alternatives are illustrated in FIGS. 5 and 6, which show the elements relating to conversion in the interface node IN1 or IN2 of a system using message-based synchronization. Naturally, the traffic is bidirectional, but only the receiving direction is shown in the figures, this direction relating to the invention.

FIG. 5 illustrates the conversion taking place in the interface unit IU of a node. The figure shows two signals (A and B) arriving in the device of the system from neighboring devices, the signal A being received at the interface unit IU1 of the node and the signal B at the interface unit IU2 of the node. The signal A arrives from a node included in the system, and it contains a synchronization message, which a signal receiving unit 13 separates and transmits further to a synchronization message receiving part 16 connected thereto. The synchronization message receiving part verifies that the message is faultless and transmits the message 18a further to the synchronization decision-making part 20 of the device, located in the centralized control unit CU of the node. The signal receiving unit 13 also monitors the quality of the signal and stores data on it in a first fault databased 24 located in the interface unit. The synchronization message receiving part 16 also receives the data on faults from the database 24. If the incoming signal A is not acceptable as regards synchronization, the synchronization message receiving part 16 forbids using it. This can be done by a separate forbiddance or by setting the value of the incoming signature as the highest possible, whereby in practice, it is not used for synchronization in any case in the latter case.

The signal B arrives from the external system ES, whereby it contains the synchronization message used in that system, a signal receiving part 14 transmitting this synchronization message to a synchronization message receiving part 17. The signal receiving part 14 monitors the state of the signal B and transmits the data on the current state to a second fault database 25. The synchronization message receiving part 17 obtains data on the state of the signal from the fault database 25. The output of the synchronization message receiving part 17 is connected to the decision-making part 20 located in the control unit CU. When the signal B is of adequate quality, the synchronization message receiving part 17 carries out the synchronization status conversion of the invention, and transmits a synchronization signature 18b to be used in the message-based system to the common decision-making part 20 of the node, the more precise format of the synchronization signature depending on the used message-based synchronization system. However, the format preferably corresponds to the format of the synchronization signature used in the message-based system. The decision-making part 20 stores all the synchronization signatures arriving in the node in a storage ST.

In an embodiment of the invention, the data on the received synchronization status of the external system is also forwarded to the common decision-making part 20 of the node.

If the signal B is not of adequate quality for synchronization, the synchronization message receiving part 17 forbids its use. Also in this case, this can be done by separately forbidding the use of the signal or by setting the incoming signature to the highest possible value (MAX-MAX-MAX).

The decision-making part 20 of the control unit CU performs the comparison of the messages, and forms a synchronization priority list on the basis of them, this list being stored in a memory 21. In the highest level of the priority list is the used clock source with the "best" synchronization signature according to the used message-based synchronization method.

FIG. 6 illustrates the other alternative of practical implementation: providing the internal synchronization signature of the message-based system in a centralized manner in connection with the decision-making process concerning synchronization. Also in this case, the signal A arrives from the internal device of the system MS2, and it contains a synchronization message. The signal receiving part 13 transmits the synchronization message to an interface-specific synchronization message receiving part 18 connected thereto, the output of which is connected to the common decision-making part 20 of the node located in the control unit CU. The receiving part 18 checks the message and then transmits it to the synchronization decision-making part 20, which forms a synchronization priority list in the memory 21. The receiving part 13 transmits the data on faults of the signal A directly to the centralized fault database 26 of the device, from which database the decision-making part 20 receives the information and is thus able to indicate the synchronization signature of the signal A to be useless during faults.

The signal B again arrives from the external system ES. The signal receiving part 14 monitors the state of the signal B and transmits the data on the current state to the fault database 26, which in this case is common to all the interfaces and from which the node's synchronization decision-making part 20 receives it. The signal receiving part 14 forwards the received data on the synchronization status of the external system to the synchronization status receiving part 17, which transmits it further (after a possible inspection) to the node's synchronization decision-making part 20. When the signal B is of adequate quality, the synchronization decision-making part 20 carries out the synchronization status conversion. When the signal B is not of adequate quality, the synchronization decision-making part 20 sets the synchronization signature of the signal B to the highest possible value or forbids its use otherwise. In the former (fault) situation, the (standard) signature concerned (or the corresponding source of synchronization) is located below all the sources of adequate quality on the priority list stored in the memory 21.

It should also be noticed that the interface units of the node can receive synchronization messages/statuses of different types. In other words, the same node may communicate with several external systems, the internal synchronization methods of which may be different among themselves.

The signal arriving from the external system ES is for instance a PCM connection according to CCITT recommendations G.703 and G.704, as stated earlier, or a signal according to recommendations G.708 and G.709, in which case an SDH network is concerned. In the following, the exemplifying situation is one where the external system is a system utilizing LP synchronization known as such, the system being connected to a system utilizing message-based synchronization by one or more 2 Mbit/s PCM connections, and the system utilizing message-based synchronization is a SOMS network as described above.

LP synchronization (Loop Protected) is an expansion of independent master-slave synchronization (used for instance in some commercially available node devices of the applicant of the present application). In independent master-slave synchronization, each node makes its own decision concerning its synchronization without obtaining any information from the outside which would support the decision-making. Since the nodes make their own decisions on synchronization independently, each node must be provided with definitions of with which node it will synchronize itself. These definitions are typically made in the form of the priority list mentioned above, a node thus selecting among the suitable incoming signals the one having the highest priority, i.e. the one with the highest position on the list, as its source of synchronization. If this signal is interrupted or its quality weakens to such a degree that it cannot be accepted as the source of synchronization any more, the node selects the signal having the next highest priority from the list. The priority list must be constructed in such a manner that all the nodes included in it are located between the node concerned and the master node, the synchronization thus spreading from the master node to the lower levels.

LP synchronization helps to maintain the desired timing in loop networks by using two status bits mcb (master control bit) and lcb (loop control bit) in addition to the priority lists mentioned above, these status bits being transmitted between network nodes. It is thus possible to define also such sources to be included in the priority lists which are not located between the node concerned and the master node. The first status bit mcb indicates whether the synchronization originates from the master node of the network. The master node defined for the network transmits this bit as a logical zero in its outgoing signals, and the other nodes forward it further if they are synchronized with a signal in which the value of the mcb bit is zero. The second status bit lcb indicates whether the synchronization comprises a loop. Each network node transmits this bit as a logical one in the direction with which it has synchronized itself and as a logical zero in other directions.

Each node uses its own priority list when selecting the source of synchronization, but it also checks the mcb and lcb bits in addition to checking the state of the signal before making a choice. A node primarily tends to find a connection the clock frequency of which originates from the master node of the network (mcb=0). If there are several of these connections, the one in the highest level of the priority list is selected. If this type of connection cannot be found (due to a fault), the node selects a working connection which has the highest position on the priority list in the normal manner. However, it is always required of the selected connection (the source of timing) that its timing is not in a loop (lcb=0), even if the actual signal were suitable for synchronization in other respects.

Since LP synchronization is a synchronization method known as such, it will not be described any further in this context. LP synchronization has been described in more detail for instance in a Master's Thesis by Jukka Kainulainen "Sanomapohjainen alistuva synkronointi digitaalisissa televerkoissa", Technical University, Faculty of Information Technology, Espoo, 1993. LP synchronization has also been described for instance in Finnish Patent Application No. 931166, which is also referred to for a more detailed description.

The status bits lcb and mcb of the external system ES using LP synchronization can be transmitted for instance in bits selected by the user in the time slot TS0 (in which case bits 4–8 can be used in every other frame, because in every other frame there is a frame alignment signal in the time slot TS0) or for instance in bits 7 and 8 when the user selects the time slot TSN (N=1 . . . 31). In the latter case, the required capacity must be taken from the capacity assigned to the payload.

The table below shows one example of conversion, which is carried out on the interface between the systems, i.e. in the manner described above either in the synchronization message receiving part of the interface node or in the decision-making part of the interface node.

| mcb bit | lcb bit | SOMS signature |
|---------|---------|----------------|
| 0       | 0       | 1-0-1          |
| 1       | 0       | 100-0-100      |
| 0       | 1       | MAX-0-MAX      |
| 1       | 1       | MAX-0-MAX      |

The table shows the mcb and lcb bits arriving in the message-based system and the SOMS signatures which the synchronization message receiving part or the decision-making part of the node forms automatically for the signals of the external system when the mcb and lcb bits contained by them have been processed. The numbers (1 and 100) appearing in the first and third part of the SOMS signature are mere examples and only represent the mutual magnitude of the figures. When the lcb bit is given the value "1", the first and third parts of the SOMS signature obtain the maximum value (MAX>100), the purpose of which is to prevent the signal concerned from being used for synchronization (even the node's internal signature is preferable in this case).

If the external system is for instance the system described in the above-mentioned U.S. Pat. No. 4,837,850 instead of a system using LP synchronization, the conversion can be carried out for instance in the following way.

| Clock message T | SOMS signature |
|---|---|
| 1/n | 1-n'-1 |
| 2/n | 5-n'-5 |
| 3/n | 20-n'-20 |

The clock message examples correspond to the clock messages described in U.S. Pat. No. 4,837,850, in which messages n can be given any permitted integer value (n=1 . . . ). The FIGS. (1, 5 and 20) appearing in the first and third part of the SOMS signature are again mere examples and only represent the mutual magnitude of the figures. The middle part n' of the SOMS signature can be given any permitted integer value (n'=0, 1 . . . ). In the most preferable (simplest) case, n' equals n.

The conversion examples presented above relate to cases in which conversion rules are stored fixedly in the node in advance, for instance at the installation stage of the equipment. The user can also define the interface between the systems, however. The user thus defines how the synchronization status received from the external system is converted into the internal synchronization status of the system using message-based synchronization. This is carried out for instance in such a manner that the user determines the highest permitted level of this internal synchronization status that can be produced in the conversion, and the synchronization status of the external system required for this level. When the synchronization status arriving from the external system deteriorates to such a degree that it falls below this level, the internal synchronization status is reduced in the manner defined either by the system or the user. In FIGS. 5 and 6, the selections defined by the user via the user interface of the device are denoted by a block 30. In the embodiment of FIG. 5, the settings determined by the user are stored in the interface unit IU2 (memory location 31) so that the interface unit would be able to convert the incoming signature correctly.

The table below shows an example of the interface between a system using LP synchronization and a SOMS network, it being possible for the user to define this interface. The user defines the integer values x and y appearing in the table, however in such a manner that x<y<MAX.

| mcb bit | lcb bit | SOMS signature |
|---|---|---|
| 0 | 0 | x-0-x |
| 1 | 0 | y-0-y |
| 0 | 1 | MAX-0-MAX |
| 1 | 1 | MAX-0-MAX |

If the external system is the system described in the above-mentioned U.S. Pat. No. 4,837,850, the conversion can be carried out for instance in the following manner. The user defines the values x, y and z appearing in the table in such a manner that x<y<z. The middle part n' of the SOMS signature may be given any permitted integer value (n'=0, 1 . . . ). In the simplest case, n' equals n, however.

| Clock message T | SOMS signature |
|---|---|
| 1/n | x-n'-x |
| 2/n | y-n'-y |
| 3/n | z-n'-z |

If the external system is also a SOMS system, the conversion can be carried out for instance in the manner shown in the table below. In this case, the user defines the values a, b, x, y and z (a<b and x<y<z). In the example, it is assumed that the middle parameter D2 representing the quality of the synchronization connection in said two different SOMS systems relates to a different quality parameter, in both of which the value zero represents the best possible state with respect to said parameter.

| SOMS signature 1 | SOMS signature 2 |
|---|---|
| better than a-0-0 | x-0-x |
| a-0-0 ≦ X ≦ b-0-0 | y-0-y |
| worse than b-0-0 | z-0-z |

Better than a-0-0 refers to a signature the first part (D1) of which is smaller than a, and worse than b-0-0 correspondingly refers to a signature the first part (D1) of which is equal to or greater than b.

Two SOMS networks connected in the manner described above have the advantage over one (larger) SOMS network that by means of the interface of the invention, it is possible to filter the changes that are insignificant as regards synchronization and to take into account only those changes occurring in the external system which are significant to synchronization. In this manner, it is possible to remove unnecessary message traffic from the network.

In general, it can be stated that the interface that can be defined by the user in the manner described above enables a flexible connection between systems, because the user can define the permitted levels of the external systems, whereby the synchronization hierarchy of different systems can be established in the desired manner.

According to a second embodiment of the invention, the conversion is carried out by utilizing the synchronization statuses of both systems. In this case, the user (or the system) defines a constant status for a signal of the external system, which the signal obtains if it is of adequate quality. This status together with the status of the external system is transmitted to the decision-making part 20 of the node. A constant status is interface-specific, because the same node may communicate with several external systems, several constant statuses of different levels being thus obtained as a result of the conversion occurring in the node.

The primary comparison can be carried out by using the synchronization signatures of the system utilizing message-based synchronization. If, however, two or more signals obtain the same status, a possible status of the external system is also included in the comparison in order to be able to define the mutual order of the above-mentioned signals having the same status. It is thus also possible to determine that among the signals having the same status, the system's own signals are in a higher level in comparison with the signals of the external system. In a message-based system, a comparison among the external signals having the same status is always performed on the basis of the statuses of the external system to determine the mutual order of the signals.

As an example of this, the connection of a system using LP synchronization to a system using message-based synchronization will be described in the following. When a signal arriving at the interface from the external system is of adequate quality and it can be used for synchronization (lcb=0), the signal obtains as its synchronization signature a constant signature (X-Y-Z), which can be different at different interfaces. In this case, the state of the mcb bit is also transmitted to the synchronization decision-making part 20 in addition to this constant signature. If many signals have the same signature, they are prioritised according to the state of the mcb bit; if the state of the mcb bit is "1", the signal concerned is in a lower level than the signals which have the same signature and the state of the mcb bit of which is "0" or the signals which have the same signature and which are internal signals of the message-based system, whereby they do not have an mcb bit.

Although the invention has been described above with reference to the examples according to the accompanying drawings, it will be apparent that the invention is not so restricted but it can be modified within the scope of the inventive idea presented above and in the appended claims. A more accurate implementation will thus largely depend on the type of the networks concerned.

We claim:

1. A method for connecting a message-based system utilizing message-based synchronization with an external system, said message-based system comprising a plurality of nodes interchanging signals containing synchronization messages with synchronization status information about a priority or quality of respective signals in an internal synchronization hierarchy of said system, said method comprising:

converting a synchronization status of a synchronization signal received from said external system into an internal synchronization status of said message-based system in an interface node of said message-based system so that a priority or quality level of said synchronization signal in said internal synchronization hierarchy of said message-based system as indicated by said converted internal synchronization status rises or falls corresponding to a corresponding rise or fall in said synchronization status of said synchronization signal received from said external system.

2. The method according to claim 1, wherein said conversion takes place automatically using conversion rules stored fixedly in said message-based system.

3. The method according to claim 1, wherein said conversion takes place using alternative conversion rules given by a user of said message-based system.

4. The method according to claim 1, wherein said conversion is carried out in a signal interface of said interface node in which a signal indicating said synchronization status is received from said external system.

5. The method according to claim 1, wherein said conversion is carried out in a centralized manner in a decision-making part of said interface node.

6. A method for connecting a message-based system utilizing message-based synchronization with an external system, said message-based system comprising a plurality of nodes interchanging signals containing synchronization messages with synchronization status information about a priority or quality of respective signals in an internal synchronization hierarchy of said system, the method comprising:

converting a synchronization status of a synchronization signal received from said external system into an internal synchronization status of said message-based system in an interface node of said message-based system so that said internal synchronization status of said message-based system for said synchronization signal achieves a constant priority or quality level in said internal synchronization hierarchy of said message-based system and that said constant level is used together with said synchronization status received from said external system to select a source of synchronization in said message-based system.

7. The method according to claim 6, wherein said conversion takes place automatically using conversion rules stored fixedly in said message-based system.

8. The method according to claim 6, wherein said conversion takes place using alternative conversion rules given by a user of said message-based system.

9. The method according to claim 6, wherein said conversion is carried out in a signal interface of said interface node in which a signal indicating said synchronization status is received from said external system.

10. The method according to claim 6, wherein said conversion is carried out in a centralized manner in a decision-making part of said interface node.

11. A network arrangement, said network arrangement comprising a message-based system utilizing message-based synchronization, said message-based system comprising a plurality of nodes interchanging signals containing synchronization messages with synchronization status information about priority or quality of respective signals in an internal synchronization hierarchy of said message-based system, wherein an interface node of said message-based system comprises:

a converter which converts a synchronization status of a synchronization signal received from an external system into an internal synchronization status of said message-based system so that a priority or quality level indicated by said internal synchronization status rises or falls corresponding to a corresponding rise or fall in said synchronization status of said external system.

12. A network arrangement, said network arrangement comprising a message-based system utilizing message-based synchronization, said message-based system comprising a plurality of nodes interchanging signals containing synchronization messages with synchronization status information about priority or quality of respective signals in an internal synchronization hierarchy of the system, wherein an interface node of said message-based system comprises:

a converter which converts a synchronization status of a synchronization signal received from an external system into an internal predetermined constant status of said message-based system; and a transmitter which transmits data describing said synchronization status of said external system to a synchronization decision-making part of said interface node.

* * * * *